United States Patent [19]

Hadzicki et al.

[11] Patent Number: 5,626,707
[45] Date of Patent: May 6, 1997

[54] APPARATUS FOR MANUFACTURING COMPOSITE TUBULAR ARTICLES

[75] Inventors: David H. Hadzicki; James E. Hadzicki, both of San Diego; Joseph R. Hadzicki, Coronado; Dale F. Thompson, San Diego; Milton G. Evangelou, Jr., Lakeside, all of Calif.

[73] Assignee: Revolution Golf, Inc., San Diego, Calif.

[21] Appl. No.: 386,097

[22] Filed: Feb. 9, 1995

[51] Int. Cl.$^6$ ............................................ B65H 81/00
[52] U.S. Cl. .................. 156/446; 156/187; 156/188; 156/189; 156/190; 156/425; 156/580; 156/583.5; 425/373
[58] Field of Search ...................... 156/169, 173, 156/175, 187, 189, 190, 425, 428–430, 446, 188, 580, 583.5; 425/373; 100/151

[56] References Cited

U.S. PATENT DOCUMENTS

| | | | |
|---|---|---|---|
| 2,674,557 | 4/1954 | Boggs | 156/190 |
| 3,790,403 | 2/1974 | Ribbans, III . | |
| 4,097,626 | 6/1978 | Tennent | 156/188 X |
| 4,132,579 | 1/1979 | VanAuken | 156/189 |
| 4,889,575 | 12/1989 | Roy | 156/189 |
| 4,938,824 | 7/1990 | Youngkeit | 156/173 |
| 4,992,133 | 2/1991 | Border | 156/498 |

FOREIGN PATENT DOCUMENTS

| | | | |
|---|---|---|---|
| 0206310 | 12/1986 | European Pat. Off. | 156/187 |
| 2525962 | 11/1983 | France | 156/187 |
| 63-296930 | 12/1988 | Japan | 156/187 |
| 5245836 | 9/1993 | Japan | 156/187 |

*Primary Examiner*—Jeff H. Aftergut
*Attorney, Agent, or Firm*—Brown, Martin, Haller & McClain

[57] ABSTRACT

A frame, a drive mechanism for rotating a mandrel, at least two spindles mounted to the frame, a tensioner, and a belt extending between the first and second spindles may be used to roll pre-preg strips or similar sheets of composite materials around the mandrel. The belt travels over the spindles, and the spindles guide the belt through changes in its direction of travel. The mandrel is mounted in the drive mechanism in contact with the belt, which changes its direction of travel around the mandrel. The lower surface of the belt bears against upper portions of the spindles, and the mandrel contacts the upper surface of the belt. As the drive mechanism rotates the mandrel, pre-preg sheets are fed between the mandrel and the belt and are thereby wrapped around the mandrel. The belt presses the pre-preg sheets against the mandrel. The wrapped mandrel may then be removed from the apparatus and cured in any suitable manner known in the art to produce a composite tubular article.

13 Claims, 2 Drawing Sheets

APPARATUS FOR MANUFACTURING COMPOSITE TUBULAR ARTICLES

BACKGROUND OF THE INVENTION

The present invention relates generally to methods and machines for manufacturing composite tubular articles such as golf club shafts and the like.

Composite articles comprise reinforcing fibers embedded in a matrix. Graphite, boron, glass, KEVLAR and other fibers are well-known. Epoxy is a well-known matrix. The fibers may be aggregated in woven textiles or in strips or sheets in which the fibers are uniaxial, i.e., unidirectionally aligned. Strips impregnated with epoxy resin are commonly known as "pre-preg" strips. To manufacture a composite article, pre-preg strips are laid upon or wrapped around a form or bonding tool in multiple plies. Although, to a certain extent, the somewhat tacky resin adheres the pre-preg strips to the bonding tool, the strips quickly begin to separate from the bonding tool, particularly if the tool is non-planar or contoured. Separation of the pre-preg from the bonding tool will not only result in a composite article that is aesthetically undesirable because it does not correspond to the contours of the bonding tool, but will also result in structural defects in the article. Adhesion can be facilitated by pre-heating the bonding tool, but to maintain the pre-preg strips firmly in contact with the surface of the bonding tool during subsequent curing processes the assembly is typically tightly enclosed in a wrapping material, such as cellophane film or a plastic bag. The wrapped assembly is then cured at a high temperature, typically between 180 and 350 degrees Fahrenheit. If the wrapping material by itself would not otherwise adequately secure the pre-preg in contact with the bonding tool during curing, the assembly may be cured in an autoclave at both a high temperature and a high pressure. The pressure collapses the bag-like wrapper and thus presses the pre-preg firmly against the surface of the bonding tool. When curing is complete, the wrapper is removed from the assembly, and the resulting composite article is removed from the bonding tool.

Golf club shafts, fishing rods and other tubular articles may be fabricated using composite materials. To fabricate such tubular articles, the pre-preg strips may be wrapped around a cylindrical bonding tool or mandrel and then cured as described above. As with any composite manufacturing process, it is desirable to ensure that the pre-preg adheres to the mandrel and conforms precisely to its taper. Rolling machines are known that comprise two generally parallel planar surfaces or platens, between which the mandrel is rolled while wrapping it with pre-preg strips. The angle between the platens may be adjusted off-parallel to conform to the mandrel taper. A drive mechanism moves the lower platen with respect to the upper platen and thereby rolls a mandrel sandwiched between them. Pre-preg strips fed between the rolling mandrel and one of the platens will thus generally be securely wrapped around the mandrel if the mandrel has a uniform taper. The mandrel may be pre-heated to facilitate adhesion of the pre-preg.

Although the above-described process is adequate for fabricating tubular composite articles having uniform tapers, the planar platens cannot roll pre-preg strips tightly against the surface of a mandrel having a non-uniform taper or other complex contours. The platens of rolling machines may therefore be provided with a resilient surface such as a rubber pad. Nevertheless, the rubber pads do not exert a sufficiently uniform pressure against the mandrel; more pressure is exerted on sections of the mandrel having greater diameters than is exerted on sections of the mandrel having smaller diameters. To further increase pressure uniformity, the platens may be divided into narrow sections that can be likened to the keys of a piano. Each piano key-like section is resiliently cushioned independently of the other sections. Nevertheless, a uniform pressure cannot be exerted against a mandrel having a diameter that changes over a distance less than the width of a single key-like section.

It would be desirable to provide an apparatus for rolling pre-preg around a mandrel having complex contours that maximizes pressure uniformity. These problems and deficiencies are clearly felt in the art and are solved by the present invention in the manner described below.

SUMMARY OF THE INVENTION

The present invention includes an apparatus for wrapping pre-preg strips around a mandrel and a method for using the apparatus to produce composite tubular articles, such as golf club shafts and fishing rod bodies. As used herein, the word "tubular" includes any shape that is symmetrical about an axis of rotation and is not limited to substantially elongated tubular shapes such as golf club shafts and fishing rod bodies.

The apparatus comprises a frame, a drive mechanism for rotating a mandrel, at least two spindles mounted to the frame, a tensioner, and a belt extending between the first and second spindles. The belt travels over the spindles, and the spindles guide the belt through changes in its direction of travel. The mandrel is mounted in the drive mechanism in contact with the belt, which changes its direction of travel around the mandrel. In an exemplary embodiment, the lower surface of the belt bears against upper portions of the spindles, and the mandrel contacts the upper surface of the belt. (Directional terms such as "upper" and "lower" are used herein only for the purpose of clarity to provide a frame of reference, and are not intended to refer to any specific orientation with respect to the Earth.) The belt is made of a material that is sufficiently flexible or pliable to conform to contours of the mandrel. As the drive mechanism rotates the mandrel, pre-preg sheets are fed between the mandrel and the belt and are thereby wrapped around the mandrel. The belt presses the pre-preg sheets against the mandrel. The wrapped mandrel may then be removed from the apparatus and cured in any suitable manner known in the art to produce a composite tubular article.

In the exemplary embodiment, the belt is not a continuous loop; rather, the ends of the belt are connected to the tensioner. Nevertheless, in certain embodiments, the belt may be continuous. The tensioner may comprise any suitable device or devices for maintaining tension in the belt relative to the first and second spindles. In the exemplary embodiment, the tensioner comprises resilient cords that connect the ends of the belt to each other and further comprises a third spindle. The belt and cords pass around the three spindles, and the third spindle is selectably movable toward and away from the first and second spindles to release and apply tension, respectively. Moving the third spindle to the position in which the belt is relaxed facilitates insertion and removal of the mandrel. In certain other embodiments, however, the tensioner may comprise other types of resilient members or other types of movable spindles. For example, although in the exemplary embodiment the movable spindle portion of the tensioner comprises a third spindle and a mechanism that moves the third spindle toward and away from the first and second spindles, in other embodiments a movable spindle type of tensioner may comprise mechanisms for moving any one or more of the spindles with respect to other spindles. The mechanisms may include a mechanical actuator, such as a pneumatic cylinder and/or may include a resilient member, such as a spring. Similarly, although in the exemplary embodiment the resilient portion of the tensioner comprises cords that connect the ends of the belt, in other embodiments a resilient type of tensioner may comprise one or more resilient members connected to the spindles or resilient material integral to the belt. In still other embodiments, the tensioner may comprise suitable combinations of the above-described tensioners.

The spindles may comprise any suitable devices between which a belt loop can extend and that facilitate movement of the belt relative to the apparatus frame. The word "loop" refers to the portion of the belt that contacts the mandrel when the apparatus is used and should not be construed to imply limitations regarding the shape, length or tension of this belt portion. The spindles may either be rotatably or non-rotatably mounted with respect to the frame. In an exemplary embodiment, the spindles comprise rotatably mounted rollers over which the belt passes. In other embodiments, however, they may comprise non-rotatably mounted projections or guides made of a low-friction material over which the belt slides. A spindle may comprise multiple portions that cooperate with the belt independently of one another. For example, a spindle may comprise multiple rollers mounted on a shaft. The apparatus may comprise different types of spindles in combination with one another.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
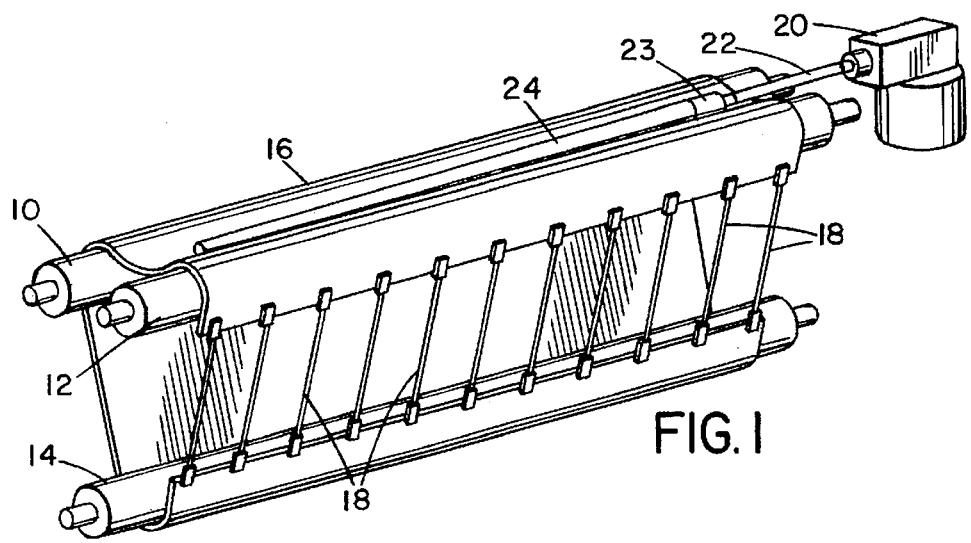
FIG. 1 illustrates the belt and support elements of an embodiment of the machine.
Figure 2:
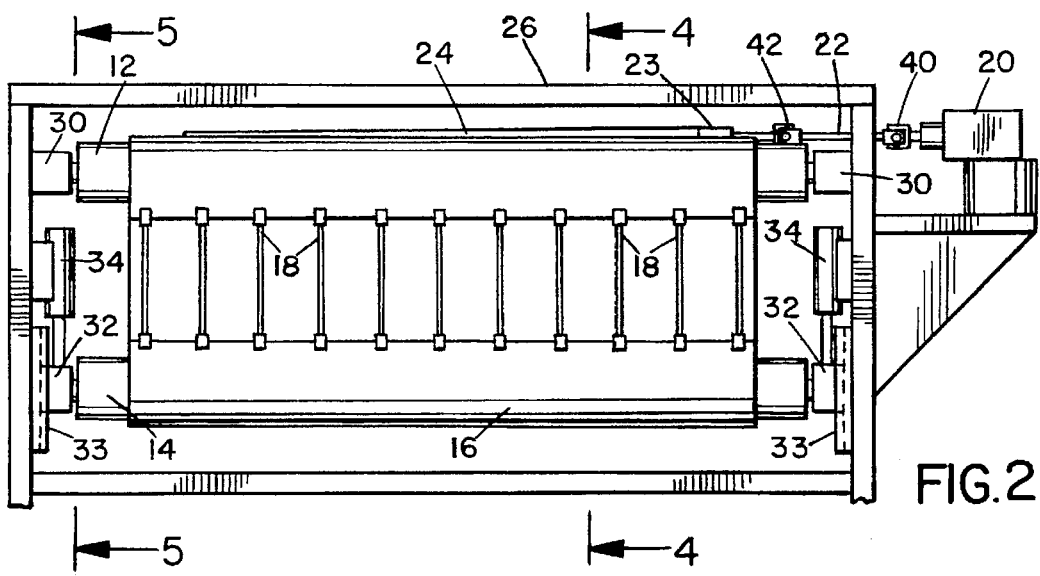
FIG. 2 is a side elevation view of a machine incorporating the belt and support assembly of FIG. 1.
Figure 3:
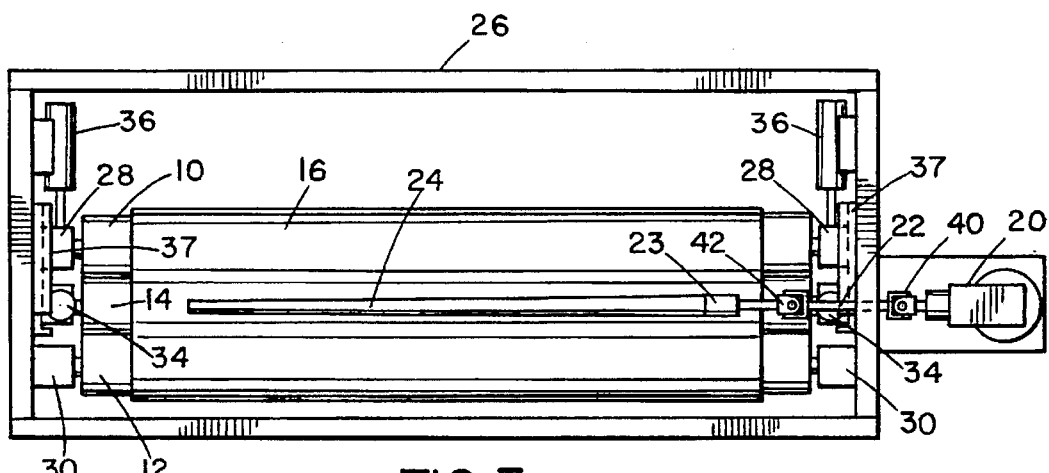
FIG. 3 is a top plan view of the machine of FIG. 2.
Figure 4:
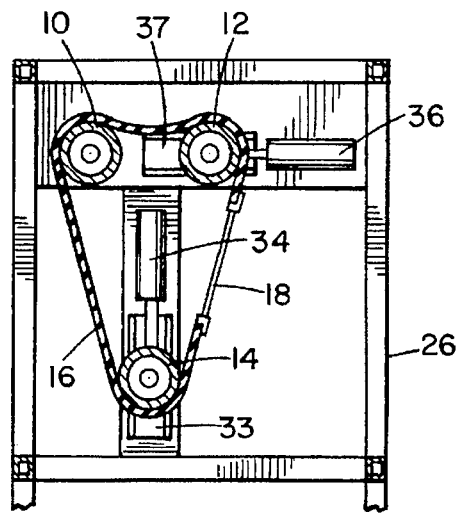
FIG. 4 is a sectional view taken on line 4—4 of FIG. 2.
Figure 5:
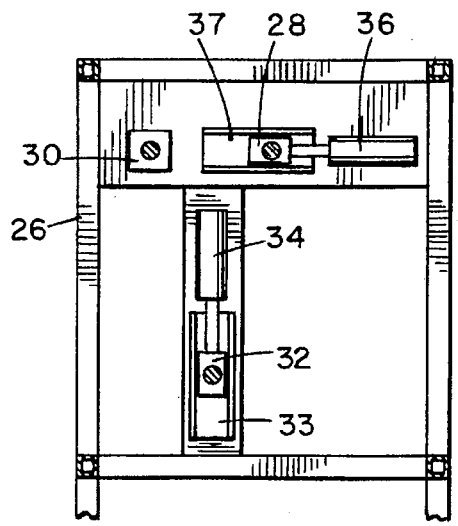
FIG. 5 is a sectional view taken on line 5—5 of FIG. 2.
Figure 6:
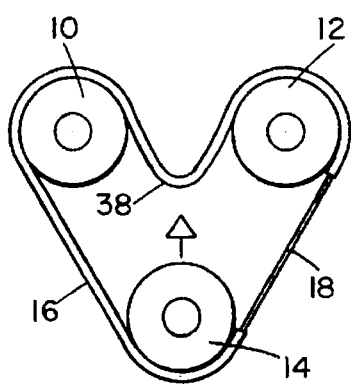
FIGS. 6–9 illustrate the steps of the manufacturing method.

As illustrated in FIG. 1, a first roller 10, a second roller 12 and a third 14 are generally parallel to one another. A belt 16 wraps around rollers 10–14. Resilient cords 18 connect the ends of belt 16 to one another. An electric drive motor 20 is connected to a drive shaft 22. A selectably releasable mounting 23 allows an operator to connect a mandrel 24 to drive shaft 22.

As illustrated in FIGS. 2–5, rollers 10–14 are rotatably mounted in a frame 26 and can be rotated freely with respect to frame 26. The ends of rollers 10 and 12 are received in bearing brackets 28 and 30, respectively. The ends of roller 14 are received in bearing brackets 32. Each of bearing brackets 32 is connected to a pneumatic cylinder 34.

A suitable controller (not shown) actuates pneumatic cylinders 34. An operator may control the actuation of cylinders 34 to either retract bearing brackets 32 and roller 14 or extend bearing brackets 32 and roller 14. Bearing brackets 32 slide in tracks 33 in response to actuation of cylinders 34. In the retracted position, roller 14 is closer to rollers 10 and 12 than in the extended position. Actuation of cylinders 34 is described below in further detail with respect to the method for using the apparatus to produce composite tubular articles. Each of bearing brackets 28 is connected to a pneumatic cylinder 36.

A suitable controller (not shown) actuates pneumatic cylinders 36. An operator may control the actuation of cylinders 36 to either retract bearing brackets 28 and roller 10 or extend bearing brackets 28 and roller 10. Bearing brackets 28 slide in tracks 37 in response to actuation of cylinders 36. In the extended position, roller 12 is closer to roller 10 than in the retracted position. In the extended position, the gap between rollers 10 and 12 is greater than the diameter of mandrel 24.

As illustrated in FIGS. 6–9, the above-described machine may be used for manufacturing a composite tubular article. Initially, an operator (not shown) actuates pneumatic cylinders 34 and 36 to retract rollers 14 and 12, respectively, thereby disposing rollers 10–14 in the relative positions shown in FIG. 6. When roller 14 is retracted, the slack in belt 16 can form a loop 38 that extends downwardly between rollers 10 and 12. Loop 38 is thus defined by the portion of belt 16 that extends over a line connecting the axes of rollers 10 and 12.

The operator then connects mandrel 24 to mounting 23 (FIGS. 1–3) and places mandrel 24 into loop 38. Mandrel 24 is preferably pre-heated before connecting it to mounting 23 to facilitate adhesion of pre-preg, as known in the art. In this position, it should be noted that the axis of mandrel 24 is vertically offset from the axis of rotation of motor 20. Drive shaft 22 has two universal joints 40 and 42 (FIGS. 2 and 3) that allow mandrel 24 to rotate in response to motor 20 while mandrel 24 is axially offset from the axis of rotation of motor 20 inside loop 38. Alternatively, a flexible drive shaft (not shown) would be suitable. In other embodiments, the motor may be mounted in vertically movable relation with respect to the frame and remain in axial alignment with mandrel 24 as mandrel 24 is moved vertically into or out of loop 38. In still other embodiments, motor 20 and mandrel 24 may remain in fixed vertical relation with respect to the frame, and rollers 10 and 12 may be mounted in vertically movable relation with respect to the frame. Any such arrangement that allows mandrel 24 to be easily inserted into and removed from loop 38 would be suitable.

Figure 7:
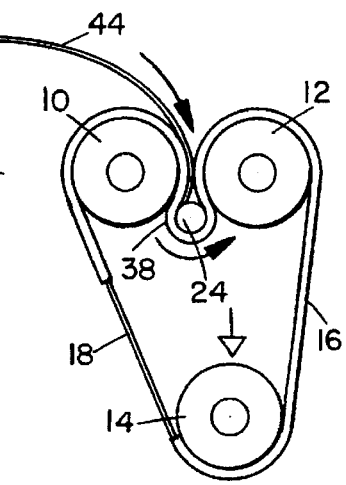
Figure 8:
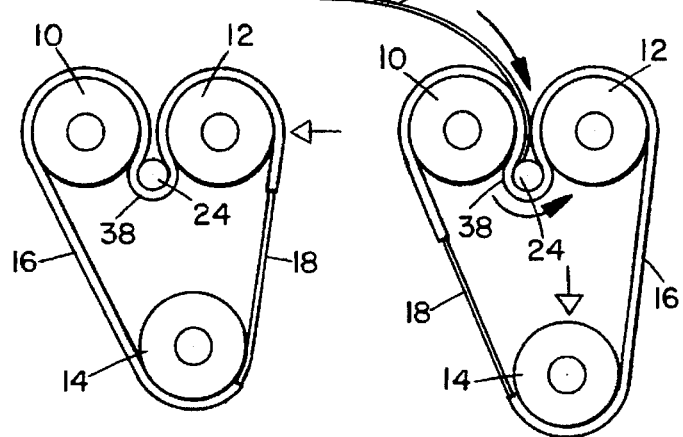

The operator actuates pneumatic cylinder 36 to extend roller 12, thereby disposing rollers 10–14 in the relative positions shown in FIG. 7. In this position, the gap between rollers 10 and 12 is less than the diameter of mandrel 24. Mandrel 24 is thus retained in loop 38 beneath rollers 10 and 12. The operator then actuates pneumatic cylinder 34 to extend roller 14, thereby disposing rollers 10–14 in the relative positions shown in FIG. 8. Extending roller 14 substantially eliminates slack in belt 16. Resilient cords 18 further contribute to the tension in belt 16.

The operator then actuates motor 20 using a suitable controller (not shown). Mandrel 24 rotates in response to rotation of motor 20 via drive shaft 22. Belt 16 rotates in response to rotation of mandrel 24 because the tension in belt 16 promotes frictional engagement between mandrel 24 and belt 16. As mandrel 24 rotates, the operator feeds a pre-preg sheet 44 into the gap between rollers 10 and 12. Pre-preg sheet 44 is pinched between belt 16 and mandrel 24. Pre-preg sheet 44 will adhere to mandrel 24 and wrap tightly around 24. The operator may successively feed pre-preg sheets 44 to built up multiple-plies on mandrel 24. The controller that operates motor 20 preferably does not rotate motor 20 in a continuous manner, but rather rotates motor 20 a sufficient number of revolutions in response to each actuation by the operator to completely wrap a pre-preg sheet 44 around mandrel 24. When motor 20 has rotated this number of revolutions, thereby disposing belt 16 in the position shown in FIG. 8, the controller reverses the direction of motor 20 to return belt 16 to its initial position. Motor 20 is preferably not rotated continuously or for a greater number of revolutions because it is preferred that cords 18 do not pass between rollers 10 and 12. Nevertheless, in certain embodiments, belt 16 may travel a greater distance. Although in the embodiment described herein, the controller controls the number of revolutions of motor 20, the operator may control motor 20 manually in certain embodiments, energizing motor 20 for a period sufficient to wrap pre-preg sheet 44 around mandrel 24.

Figure 9:
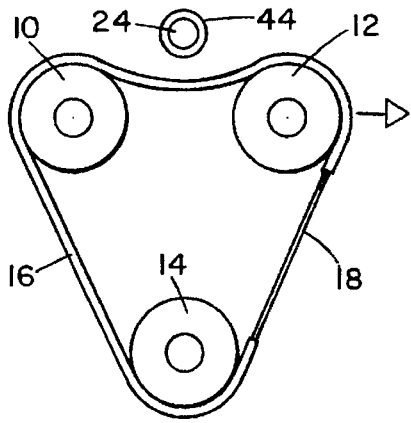

The operator actuates pneumatic cylinder 36 to retract roller 12, thereby disposing rollers 10–14 in the relative positions shown in FIG. 9. The tension in belt 16 raises the wrapped mandrel 24 to a position in which it is easily accessible to the operator. The operator may then remove the wrapped mandrel 24 from mounting 23. The wrapped mandrel 24 may be cured in any suitable manner known in the art, such as by placing it in an oven or autoclave. After curing, the resulting composite article may be removed from mandrel 24, as known in the art.

Although the machine of the present invention may be used for forming any type of tubular composite article, it is particularly suitable for forming tubular composite articles having multiple tapers or having contours or non-uniform tapers. Belt 16 conforms to such contours and presses prepreg sheet 24 firmly against mandrel 24 in a substantially uniform manner along the entire length of mandrel 24. To facilitate this uniform application of pressure, belt 16 may be made of any suitable pliable sheet-like material. The material is preferably sufficiently flexible, pliable or elastic to conform to the contours of the mandrel but also sufficiently rigid to travel in response to rotation of mandrel 24 without stretching excessively. Furthermore, the material is preferably sufficiently slippery to resist adherence of pre-preg but provides sufficient friction to rotate in response to rotation of mandrel 14. A material that has been used with suitable results is a woven matting known as "shade cloth," which is used for covering patios. This material has a fill comprising numerous closely-spaced, relatively thin, plastic fibers interwoven with a weft comprising a yarn having a lesser number of relatively thicker and stronger plastic fibers with the yarn strands spaced relatively further apart. Such shade cloth is sold under the brand name SARLON and is manufactured by Sadon Industries, Ltd. of New South Wales, Australia. Pre-preg does not readily adhere to the coarsely woven plastic. It is also believed that the lighter fill and heaver weft promotes uniform application of pressure against the mandrel. Belt 16 rotates in a non-uniform manner in response to rotation of a tapered mandrel; the taper causes certain portions of belt 16 to travel a different distance than other portions. Belt 16 will therefore be stretched diagonally. When the material described above is stretched diagonally, the weft fibers remain essentially parallel to one another and are displaced only axially with respect to one another. Essentially only the fill fibers are displaced diagonally, i.e., displaced from their perpendicular orientation with respect to the weft fibers. The heavier and thicker weft yarn strands, which thus contact the mandrel to a significantly greater extent than the fill fibers, remain in contact with essentially the same portion of the mandrel throughout the rolling step. In other words, a single weft strand does not significantly stretch diagonally across the mandrel but rather remains essentially parallel to the mandrel during the rolling step. The weft strands, which are spaced about one-eighth of an inch apart, are therefore extremely responsive to changes in mandrel diameter that occur over distances as small as one-eighth of an inch. Nevertheless, the belt conforms to changes in mandrel diameter regardless of the rate of taper because the fill fibers between the weft fibers also contact the mandrel to a certain extent. Indeed, it is believed that the weft fibers contact the mandrel to a greater extent when the belt is stretched diagonally, thereby automatically providing additional pressure in response to a change in taper.

Figure 10:
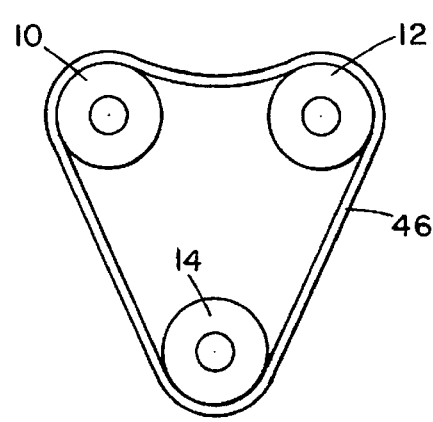
FIG. 10 illustrates an alternative arrangement having a continuous belt.

In the embodiment described above, the tensioner that applies tension to belt 16 comprises resilient cords 18 as well as vertically movable roller 14. Nevertheless, in certain embodiments, the tensioner may comprise other movable mechanisms and/or stretchable resilient members. As illustrated in FIG. 10, a continuous belt 46 not having resilient cords may be used if the tensioner otherwise applies sufficient belt tension.

In the embodiment described above, the spindles between which loop 38 extends comprise rollers 10 and 12. Nevertheless, in certain embodiments, the spindles may comprise non-rotatable, low-friction elements or protrusions, over which belt 16 glides rather than rolls.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An apparatus for wrapping material around a mandrel, said apparatus comprising:
   a frame;
   first and second spindles connected to said frame;
   a belt in contact with a portion of each of said first and second spindles, said belt movable in a belt movement direction, said belt having two ends and including a resilient member connecting said ends; and
   a drive mechanism having a rotatable driven portion with an axis of rotation extendable perpendicular to said belt movement direction, said mandrel mountable on said driven portion said belt and said resilient member movable in said belt movement direction as a result of actuation of said drive mechanism.

2. The apparatus claimed in claim 1, wherein said belt has an upper surface and a lower surface, portions of said lower surface of said belt are in contact with portions of each of said first and second spindles when a portion of said upper surface of said belt is in contact with said mandrel.

3. The apparatus claimed in claim 1, wherein said first and second spindles are rotatably mounted on said frame.

4. The apparatus claimed in claim 1, wherein a plurality of elastic cords connect said ends of said belt.

5. The apparatus claimed in claim 4, further comprising a third spindle, wherein said belt and elastic cords extend around said first, second and third spindles.

6. The apparatus claimed in claim 1, further comprising a third spindle movably mounted to said frame, wherein said third spindle is movable toward and away from said first and second spindles.

7. The apparatus claimed in claim 6, further comprising an actuator for selectably moving said third spindle toward and away from said first and second spindles.

8. The apparatus claimed in claim 7, wherein said actuator is pneumatically operated.

9. The apparatus claimed in claim 8, wherein a plurality of elastic cords connect said ends of said belt.

10. The apparatus claimed in claim 9, further comprising a third spindle, wherein said belt and elastic cords extend around said first, second and third spindles.

11. The apparatus claimed in claim 1, wherein at least one of said first and second spindles is movably mounted to said frame and movable toward and apart from the other of said spindles.

12. The apparatus claimed in claim 11, wherein said first and second spindles are rotatably mounted on said frame.

13. The apparatus claimed in claim 11, further comprising an actuator for selectably moving at least one of said first and second spindles toward and apart from the other of said spindles.

* * * * *